(12) United States Patent
Bassoli et al.

(10) Patent No.: US 12,554,048 B2
(45) Date of Patent: Feb. 17, 2026

(54) ZOOM LENS

(71) Applicant: OPTO ENGINEERING S.P.A., Mantova (IT)

(72) Inventors: Nicolò Bassoli, Mantova (IT); Luca Rizzotto, Mantova (IT); Andrea Bertolucci, Mantova (IT)

(73) Assignee: OPTO ENGINEERING S.P.A., Mantova (IT)

( * ) Notice: Subject to any disclaimer, the term of this patent is extended or adjusted under 35 U.S.C. 154(b) by 390 days.

(21) Appl. No.: 18/113,708

(22) Filed: Feb. 24, 2023

(65) Prior Publication Data

US 2023/0273499 A1 Aug. 31, 2023

(30) Foreign Application Priority Data

Feb. 28, 2022 (IT) .......................... 102022000003692

(51) Int. Cl.
*G02B 3/14* (2006.01)
(52) U.S. Cl.
CPC ..................................... *G02B 3/14* (2013.01)

(58) Field of Classification Search
CPC .... G02B 3/14; G02B 26/004; G02B 13/0075; G02B 13/009; G02B 13/22; G02B 15/04; G02B 15/06; G02B 15/08
See application file for complete search history.

(56) References Cited

U.S. PATENT DOCUMENTS

| | | |
|---|---|---|
| 2009/0091844 A1 | 4/2009 | Jannard et al. |
| 2012/0013990 A1 | 1/2012 | Yamamoto |
| 2016/0202455 A1 | 7/2016 | Aschwanden et al. |
| 2022/0050270 A1* | 2/2022 | Hosoi .................... G02B 15/20 |

* cited by examiner

*Primary Examiner* — James C. Jones
(74) *Attorney, Agent, or Firm* — CANTOR COLBURN LLP

(57) ABSTRACT

A zoom lens is provided which has at least one front optical group with fixed optical power, adapted to receive rays from an observed object, at least one rear optical group with fixed optical power, adapted to convey the rays towards an image plane of a sensor, a lens opening positioned between the front optical group and the rear optical group, a front adaptive lens positioned between the at least one front optical group and the lens opening, and a rear adaptive lens positioned behind the lens opening. The front and rear adaptive lenses are controllable to vary the respective optical power to adjust focal length, magnification, and working distance of the zoom lens.

15 Claims, 6 Drawing Sheets

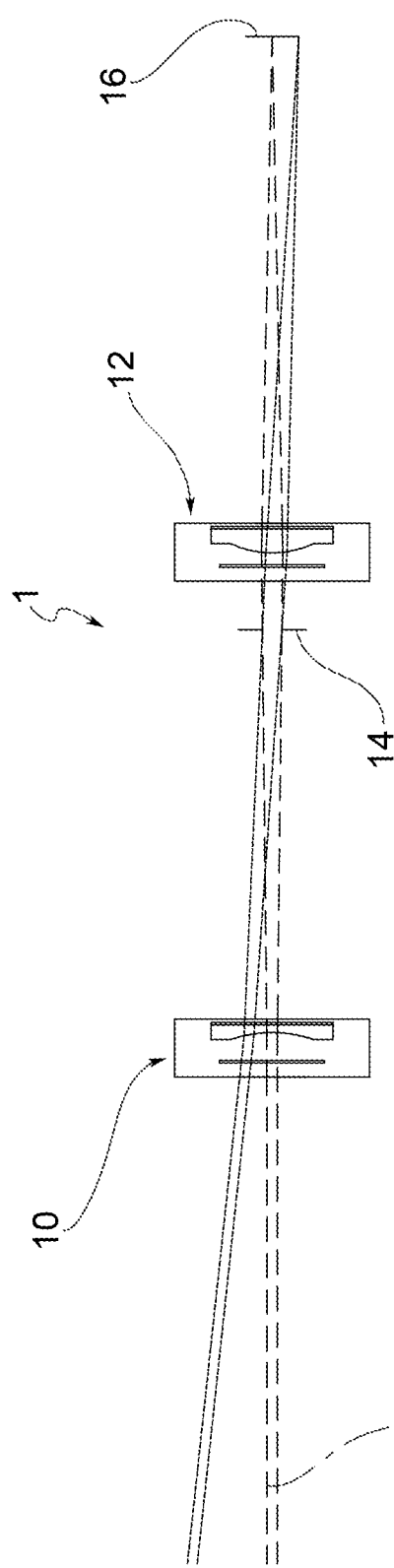
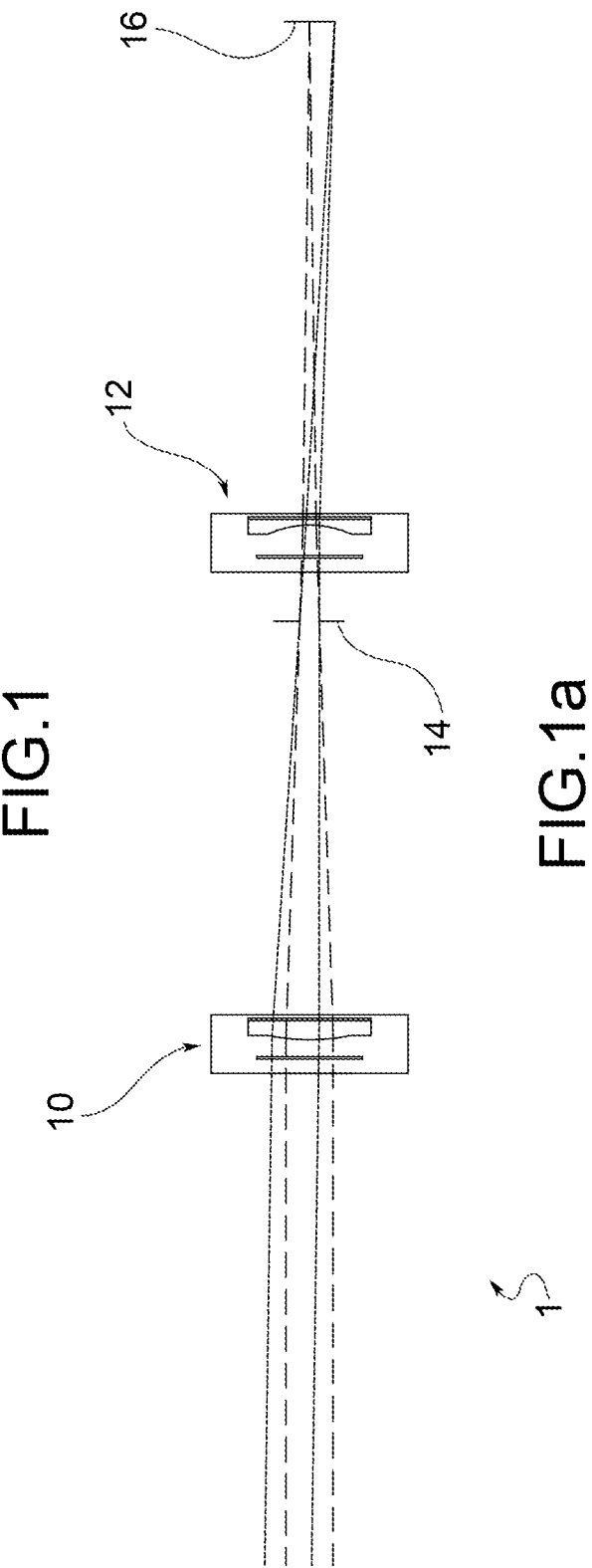

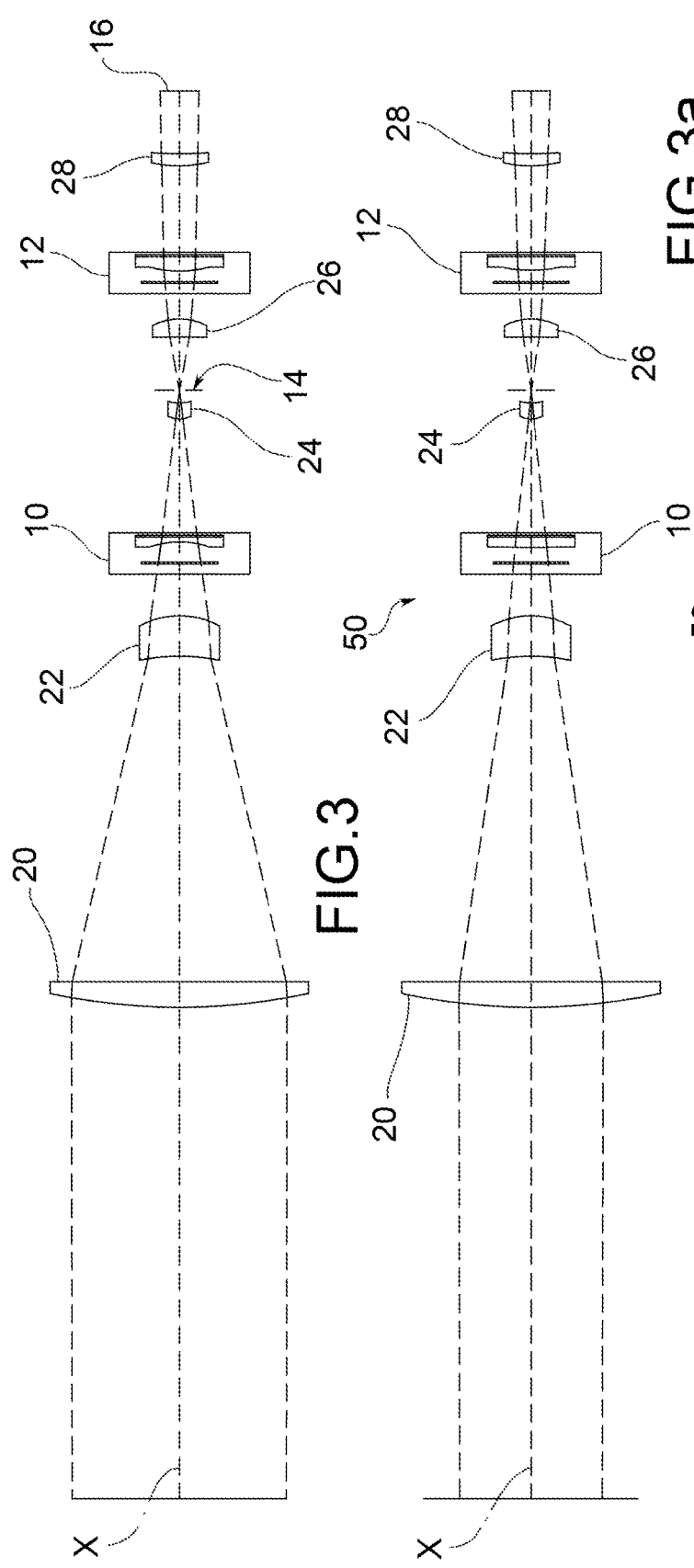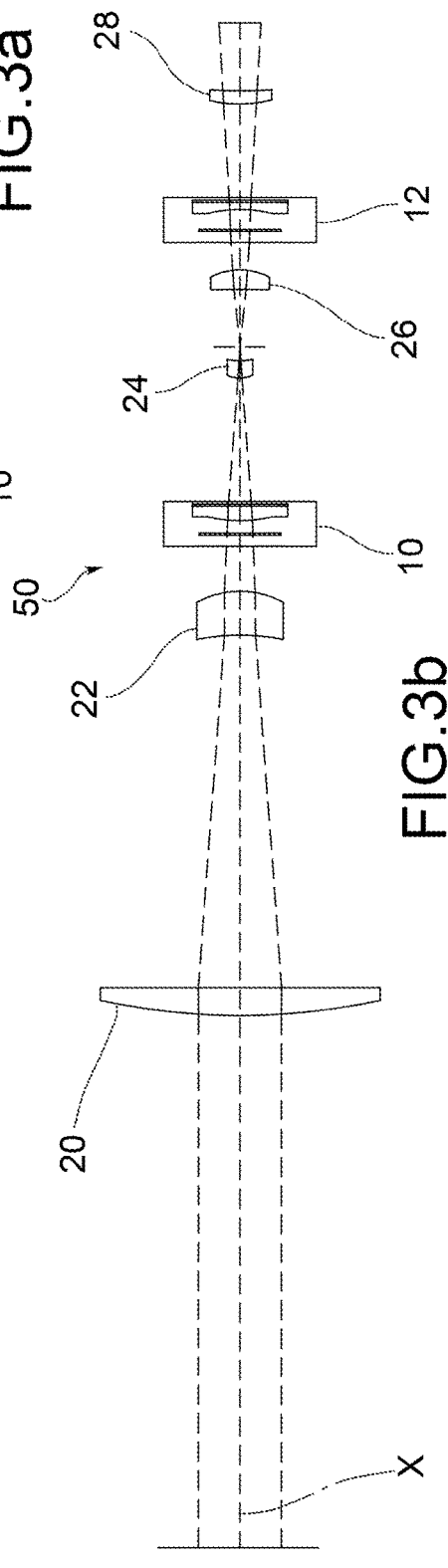

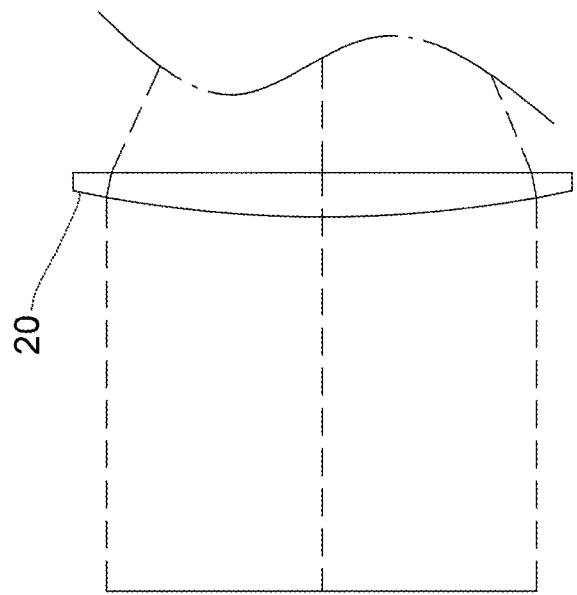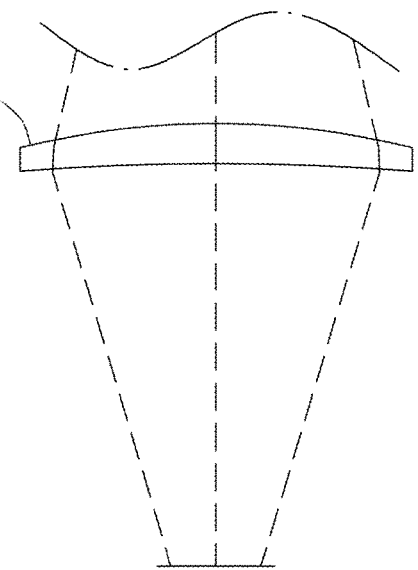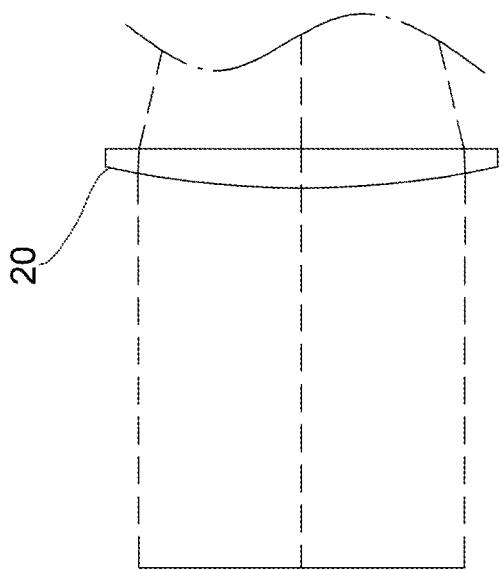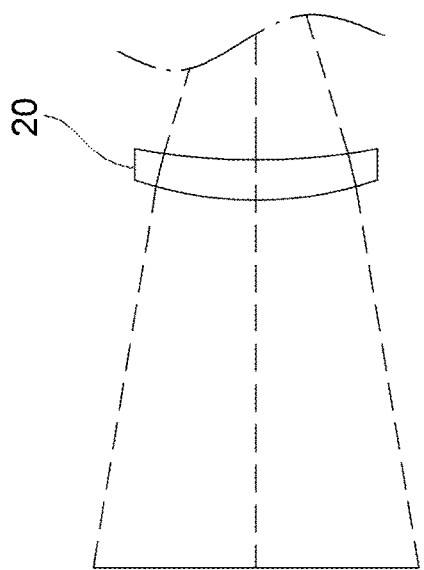

ZOOM LENS

CROSS-REFERENCE TO RELATED APPLICATION

This application claims priority to Italian Patent Application No. 102022000003692 filed Feb. 28, 2022, the entire contents of which is hereby incorporated in its entirety by reference.

FIELD OF THE INVENTION

The present disclosure relates to a zoom lens, in particular for an artificial vision device.

BACKGROUND OF THE INVENTION

Zoom lenses are traditionally implemented by mechanically moving two or more optical groups, each formed from one or more lenses. By means of this movement, it is possible to modify the focal length of the entire lens, and consequently the magnification of the system (zooming).

Moreover, an additional mechanical movement is often implemented in order to keep the image in focus (focusing).

SUMMARY OF THE INVENTION

The aim of the present disclosure is to provide a zoom lens having an optical and a mechanical structure that is simpler than traditional zoom lenses.

This aim is achieved by a zoom lens and an artificial vision device as described and claimed herein.

Preferred or advantageous embodiments of the zoom lens according to the present disclosure are also described.

The idea behind the present invention is to use two adaptive lenses instead of movable optical groups. The result is a zoom lens that is devoid of mechanical movements, wherein it is possible to modify the focal length and focusing of the system by acting solely upon the optical power of the two adaptive lenses inserted within the lens.

An adaptive lens, or liquid lens, also known as a "tunable lens", is a particular type of lens composed of a substance, such as a liquid or gel, within a chamber. Such a substance may be composed of one or more gases, one or more liquids, or a mixture of one or more solids with one or more liquids. By means of electrical or mechanical actuation, it is possible to modify the optical power of the adaptive lens, for example by modifying the shape of the chamber, or the arrangement of the substance therein, or both.

As shown in FIGS. 1 and 1a, using two adaptive lenses simultaneously in an optical system, by changing the optical power thereof it is possible to change the focal length of the system.

The zoom lens of the present disclosure comprises at least one front optical group with fixed optical power, adapted to receive rays from an observed object, at least one rear optical group with fixed optical power, adapted to convey the rays towards an image plane of a sensor, a lens opening, or stop, positioned between the front optical group and the rear optical group, at least one front adaptive lens, positioned between the at least one front optical group and the lens opening, and at least one rear adaptive lens, positioned behind the lens opening.

The front and rear adaptive lenses are controllable to vary the relevant optical power so as to adjust the focal length, magnification, and working distance of the zoom lens.

In one embodiment, the front and rear adaptive lenses are controllable so that the focal length, magnification, and working distance of the zoom lens are independently adjustable.

Furthermore, in one embodiment, the front and rear adaptive lenses are controllable so that the focal length, magnification, and working distance of the zoom lens are continuously adjustable.

It is however possible to control the adaptive lenses so that the adjustment of the magnification and/or focal length and/or working distance takes place discreetly.

In one advantageous embodiment, the front and rear optical groups and the front and rear adaptive lenses are devoid of elements for adjusting the respective position along the optical axis of the lens.

As anticipated above, each adaptive lens comprises an optical chamber containing a substance, for example a liquid substance, a gas or a gel. The optical power of the lens is adjustable by applying an electrical or mechanical signal adapted to modify the shape of the optical chamber and/or the arrangement of the substance therein.

BRIEF DESCRIPTION OF THE FIGURES

Further features and the advantages of the zoom lens according to the present disclosure will become readily apparent from the following description of preferred exemplary embodiments thereof, provided purely by way of non-limiting example, with reference to the accompanying figures, wherein:

FIG. 1 shows an optical diagram of a lens employing two adaptive lenses;

FIG. 1a is an optical diagram similar to that of FIG. 1, wherein the adaptive lenses have a different optical power resulting in a lens with a different focal length;

FIGS. 3, 3a and 3b show various optical diagrams of a telecentric zoom lens according to the present invention, wherein changing the optical power of the two adaptive lenses results in various magnifications of the optical system;

FIGS. 4, 4a, 4b and 4c show various configurations of the front optical unit;

DETAILED DESCRIPTION

Figure 2:
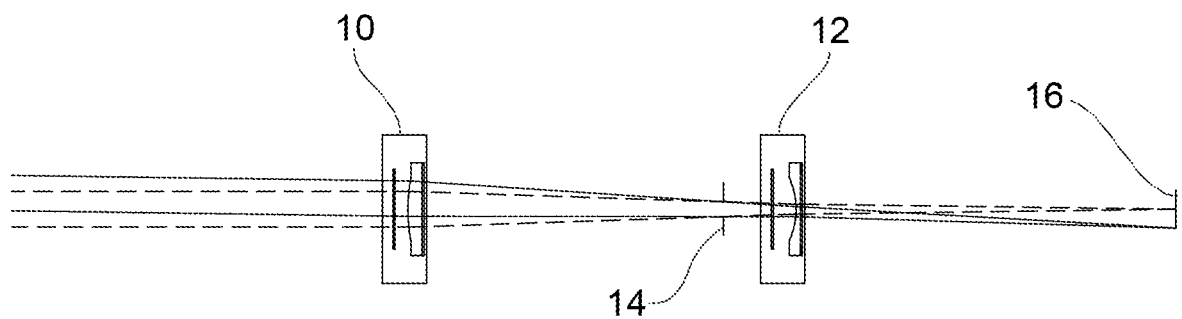
FIGS. 2, 2a, 2b and 2c show optical diagrams similar to the previous ones, wherein changing the optical power of the two adaptive lenses results in different working distances of the optical system at different focal lengths.

FIGS. 1 and 1a show the optical diagrams of an optical system 1 employing a front adaptive lens 10 and a rear adaptive lens 12. The optical system 1 is arranged along an optical axis X.

The optical system 1 has an opening 14, or stop, between the two adaptive lenses 10, 12.

The front adaptive lens 10 is adapted to collect light rays from an object at infinity in order to convey them towards the rear adaptive lens 12, passing through the opening 14.

The rear adaptive lens 12 is adapted to collect light rays from the front adaptive lens 10 in order to convey them towards an image plane 16 of a sensor.

By changing the optical power of the two adaptive lenses 10, 12, it is possible to change the focal length of the entire optical system 1. In the example of FIGS. 1 and 7a, the two optical systems have different focal lengths.

Furthermore, it is possible to change the working distance of the optical system at any obtainable focal length, by acting solely upon the optical power of the front 10 and rear 12 adaptive lenses.

Figure 2A:
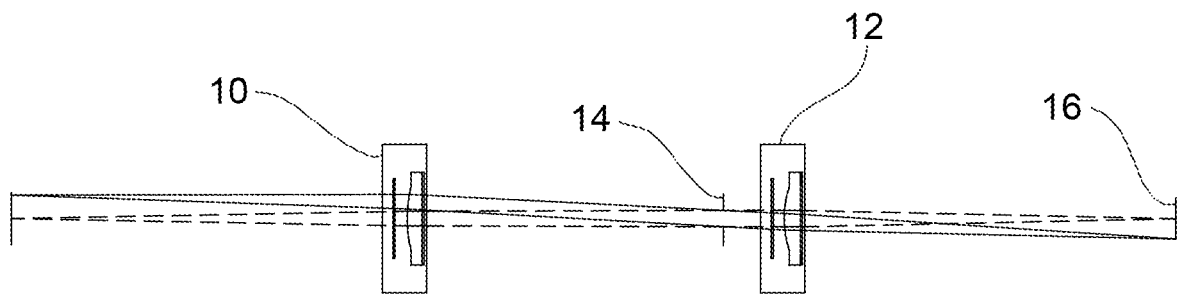
Figure 2B:
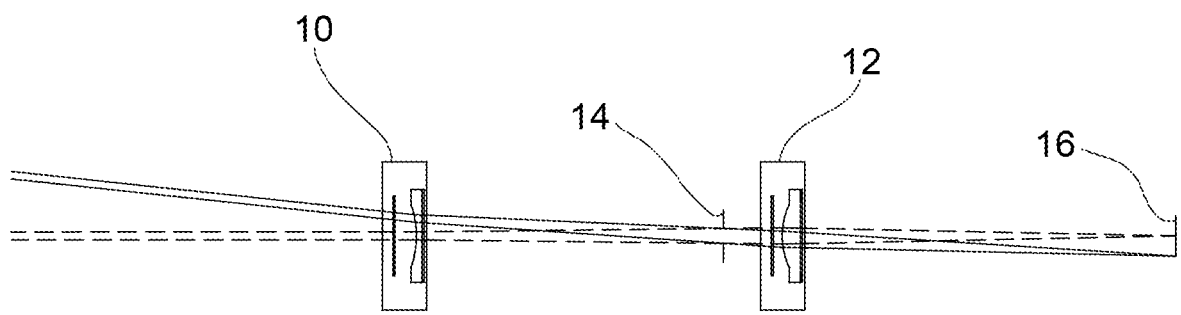
Figure 2C:
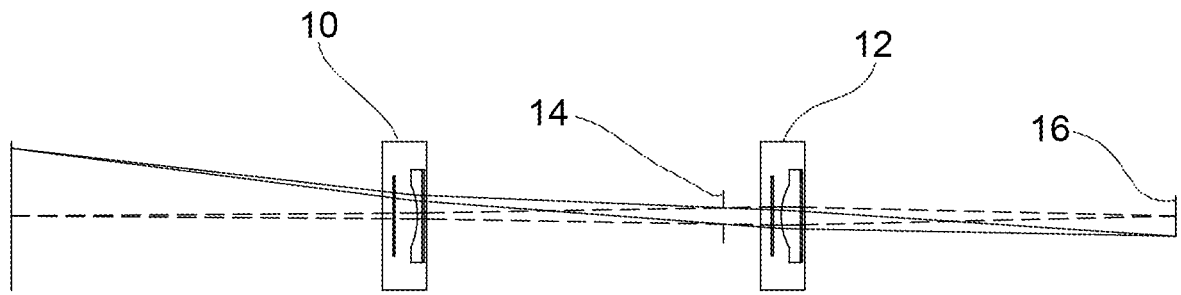

This is represented in the optical diagrams of FIGS. 2-2c. In particular, the optical systems of FIGS. 2 and 2a have the same focal length, but a different working distance. The optical systems of FIGS. 2b and 2c have the same focal length, which is different from that of the optical systems of FIGS. 2 and 2a, but have a different working distance.

Using this optical working principle, zoom lenses, and in particular macro zoom and telecentric zoom lenses, may be developed by inserting static optical groups before, in between and/or after the two adaptive lenses. These systems do not require moving optical groups because the change in magnification, focusing and change in working distance are solely implemented by means of the variation in power of the two adaptive lenses.

Figure 5:
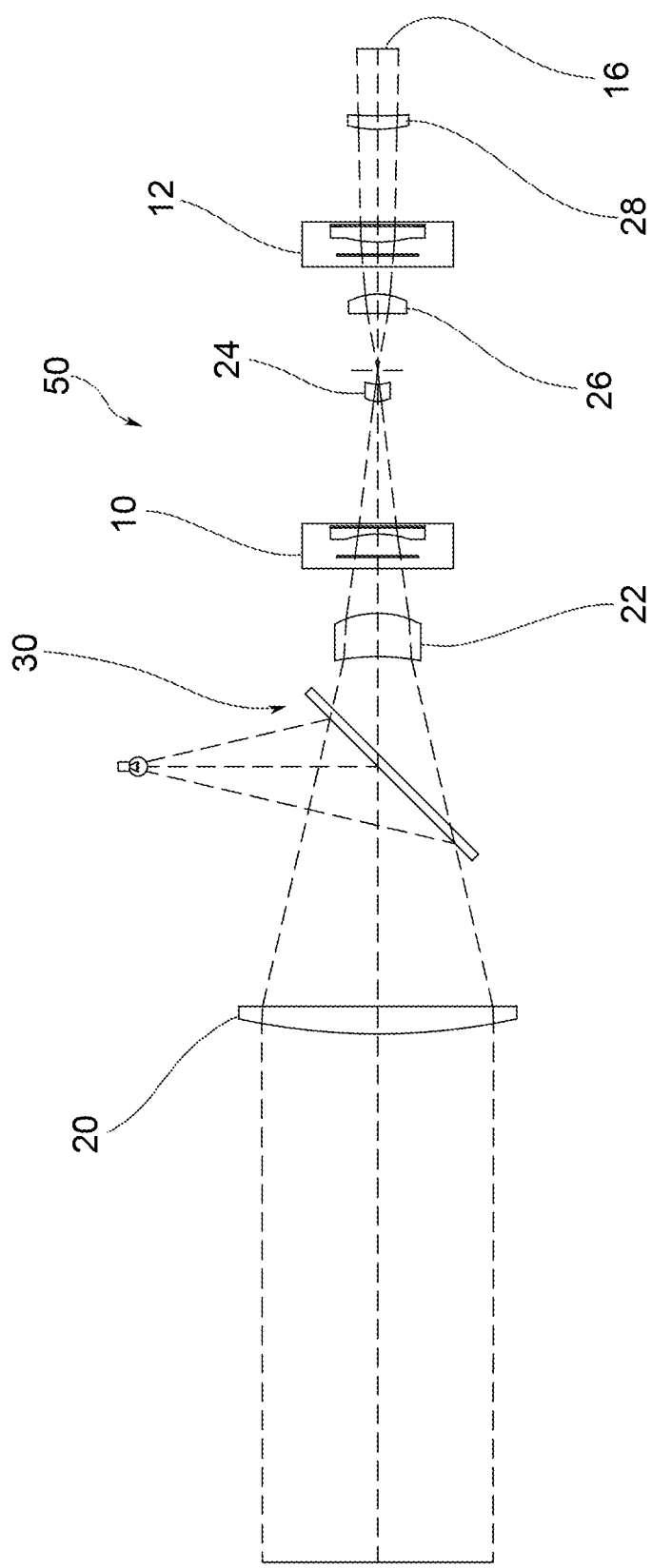
FIG. 5 shows the optical diagram of a zoom lens according to the present invention, in one embodiment variant.

With reference to FIGS. 3, 4 and 5, practical examples of zoom lenses according to embodiments of the present disclosure will be described hereinbelow.

The operating principle described above may be exploited in order to implement macro and telecentric zoom lenses wherein the magnification, focusing and working distance are independently variable.

FIGS. 3-3b show various optical diagrams of a telecentric zoom lens 50.

Telecentric lenses are optical systems that are widely used in the field of artificial vision, for example for non-contact measurement of objects by virtue of the specific property thereof of collecting cones of light rays from the illuminated object, whose axis, or main ray, is parallel to the axis of the optical system itself. In this way, in fact, the size of the image created by the lens is independent from the distance at which the observed object is arranged and this makes it possible to make the measurement the more accurate because it is devoid of the characteristic perspective effects of every other type of optics.

This property, called telecentricity, is implemented, as is known, using a lens wherein the opening of the lens is optically arranged at infinity, with respect to the object observed. This peculiarity is made possible by having the optical elements positioned between the lens opening and the observed object create, as a whole, an optical group with a positive focal length, the focused position of which coincides with the position of the lens opening.

The telecentric zoom lens 50 is implemented using five fixed optical groups 20, 22, 24, 26, 28 and two adaptive lenses 10, 12. By changing the power of the adaptive lenses it is possible to change the magnification, focusing and working distance of the lens. The optical diagrams of FIGS. 3, 3a and 3b show three of the possible configurations in which the lens may operate, each configuration having a different magnification at the same working distance.

The zoom lens 50 comprises, spaced along the optical axis X, a front adaptive lens 10, a rear adaptive lens 12, a lens opening 14 between the two adaptive lenses 10, 12, and a number, variable from two to five, of fixed optical groups 20, 22, 24, 26, 28. By changing the power of the adaptive lenses it is possible to change the magnification, focusing and the working distance, for example continuously.

The zoom lens 50 comprises a first front optical group 20. This first front optical group 20 may be composed of one or more lenses and/or doublets and/or triplets.

This group collects the rays coming from the object space and conveys them towards a second front optical group 22.

Depending upon the size thereof and the focal length thereof, the first front optical group 20 may collect rays from objects of different sizes, either telecentrically or with a certain entrance angle (entocentric or hypercentric). By modifying the first front optical group 20 and leaving the remaining optical system unchanged, it is possible to create new lenses with differing framed fields, as shown for example in FIGS. 4-4c.

These figures therefore show possible configurations of the zoom lens 50 as the first front optical group 20 varies. In particular:

FIG. 4 shows a telecentric configuration;

FIG. 4a shows a telecentric configuration with a maximum framable object of a different size compared to that of FIG. 4;

FIG. 4b shows an entocentric or macro configuration; and

FIG. 4c shows a hypercentric configuration.

Turning now to the optical diagram of the zoom lens 50, the second front optical group 22 may not be present or, if present, may be composed of one or more lenses and/or doublets and/or triplets. The group receives the rays from the first front optical group 20 and directs them towards the front adaptive lens 10, so as to optimize the coupling of the rays from the first front optical group 20 to the opening of the front adaptive lens 10. Contemporaneously, the second front optical group 22 may help improving the chromatic correction of the first front optical group 20.

The second front optical group 22 may be used to improve the operation of the lens, but it is not necessary.

The front adaptive lens 10 is the first active optical element of the system. It may generate negative, positive or zero optical power. As the optical power varies, it is possible to change the magnification, focusing and working distance of the optical system. The formation of a focused image at a certain magnification and a certain working distance is possible by means of the combined action of the front adaptive lens 10 and the rear adaptive lens 12.

An intermediate optical group 24 may be interposed between the front adaptive lens 10 and the lens opening 14.

The intermediate optical group 24 may not be present or, if present, may be composed of one or more lenses and/or doublets and/or triplets. The group receives the rays from the front adaptive lens 10 and directs them towards the lens opening 14 of the system.

The intermediate optical group 24 may be employed to improve the operation of the lens, in particular it may help minimizing spherical aberration.

The lens opening 14 may be of either fixed or variable opening. In the latter case, it may be manually or electrically changeable. It determines the brightness and size of the cones of rays forming the image.

The zoom lens 50 comprises a first rear optical group 26 and a second rear optical group 28.

At least one of the two rear optical groups 26, 28 must be present.

The first rear optical group 26 may be composed of one or more lenses and/or doublets and/or triplets. The group receives the rays from the lens opening 14 and directs them towards the rear adaptive lens 12, so as to couple the rays from the lens opening 14 to the opening of the rear adaptive lens 12.

It should be noted that, in modifying the first rear optical group 26 and leaving the remaining optical system unchanged, it is possible to change the size of the image formed by the optical system.

The rear adaptive lens 12 is the second active optical element of the system. It may generate negative, positive or zero optical power. As the optical power varies, it is possible to change the magnification, focusing and working distance of the optical system. The formation of a focused image at a certain magnification and a certain working distance is possible by means of the combined action of the front adaptive lens 10 and the rear adaptive lens 12.

The second rear optical group 28, which may or may not be necessary for the implementation of the lens, depending upon the presence or absence of the first rear optical group 26, may be composed of one or more lenses and/or doublets and/or triplets.

The second rear optical group 28 receives the outgoing rays from the rear adaptive lens 12 and directs them towards the sensor, where the image is formed. The second optical group 28 may be employed to improve the operation of the lens, in particular it may help minimizing the field curvature.

It should be noted that, in modifying the second rear optical group 28 and leaving the remaining optical system unchanged, it is possible to change the size of the image formed by the optical system.

In one embodiment, shown in FIG. 5, the zoom lens 50 may house one or more coaxial lighting modules 30 positioned between any two of the elements of the zoom lens 50.

Advantageously, the zoom lens 50 described above may be part of a series of lenses, wherein the front optical groups 20, 22 with a fixed optical power and the rear optical groups 26, 28 with a fixed optical power are modular, that is they are removably attached to the lens body so that they may be easily replaced in order to implement zoom lenses with differing optical characteristics.

As described above, the zoom lens 50 may be a telecentric, hypercentric, or entocentric optical system. In the latter case, it may be optimized for use in a macro configuration.

The zoom lens described may be optimized at any stop aperture, up to a maximum aperture of $f/1.4$. The lens opening may be of fixed or variable opening.

The lens may be optimized in order to operate without vignetting with any sensor, up to a full frame sensor.

The lens may be optimized in order to operate at any working distance, from 0 to +infinity. The working distance may be continuously modified by means of the adaptive lenses present within the optical system. It may also be modified discretely by means of spacers positioned between the lens and the camera.

The lens may be optimized in order to achieve any absolute magnification continuously, up to 10× magnification.

The lens may be optimized in order to achieve any magnification ratio, that is the ratio between the maximum absolute magnification achievable by the optical system and the minimum absolute magnification, continuously, up to a magnification ratio of 20×.

The front and rear adaptive lenses 10, 12 may be controlled by a controller.

In particular, the adaptive lenses may be calibrated to control the magnification, focusing and working distance of the system in a precise and predictable way, for example by means of lookup tables (mapping of the space of the configurations) or theoretical or experimental behavior curves which make it possible to calculate and specify, independently and unequivocally, the desired working conditions for the optical system.

The calibration of the adaptive lenses may also take temperature into account, which influences the behavior thereof. The adaptive lenses may be calibrated in advance in order to take into account the effects of temperature and correct any effects caused by the variation in temperature of each individual adaptive lens.

In some embodiments, the adaptive lenses may integrate temperature detectors therein. If a temperature sensor is not integrated therein, one or more sensors may be arranged as close as possible to the adaptive lenses.

In some embodiments, the controller—not shown—may be integrated into the adaptive lenses, within the lens mechanics, or within the camera.

In other embodiments, the controller is external to the optical system.

In one embodiment of the lens with the telecentric zoom configuration, by using adaptive lenses with built-in memory for real-time reading and correction of temperature effects, the equivalence between the expected theoretical behavior and the measured actual behavior of the adaptive lenses has been successfully verified.

In this way it was possible to extrapolate and confirm laws that accurately and predictively describe, at a fixed working distance, the magnification variation of the lens as a function of the optical powers set for the adaptive lenses.

This makes it very easy for the user, once the working distance has been set, to select the desired magnification. The magnification may be determined by control software by means of the correct setting of the optical powers of the two adaptive lenses, thus exploiting laws that describe, for different working distances, the variation of magnification of the lens as a function of the optical powers set for the adaptive lenses.

Figure 6:
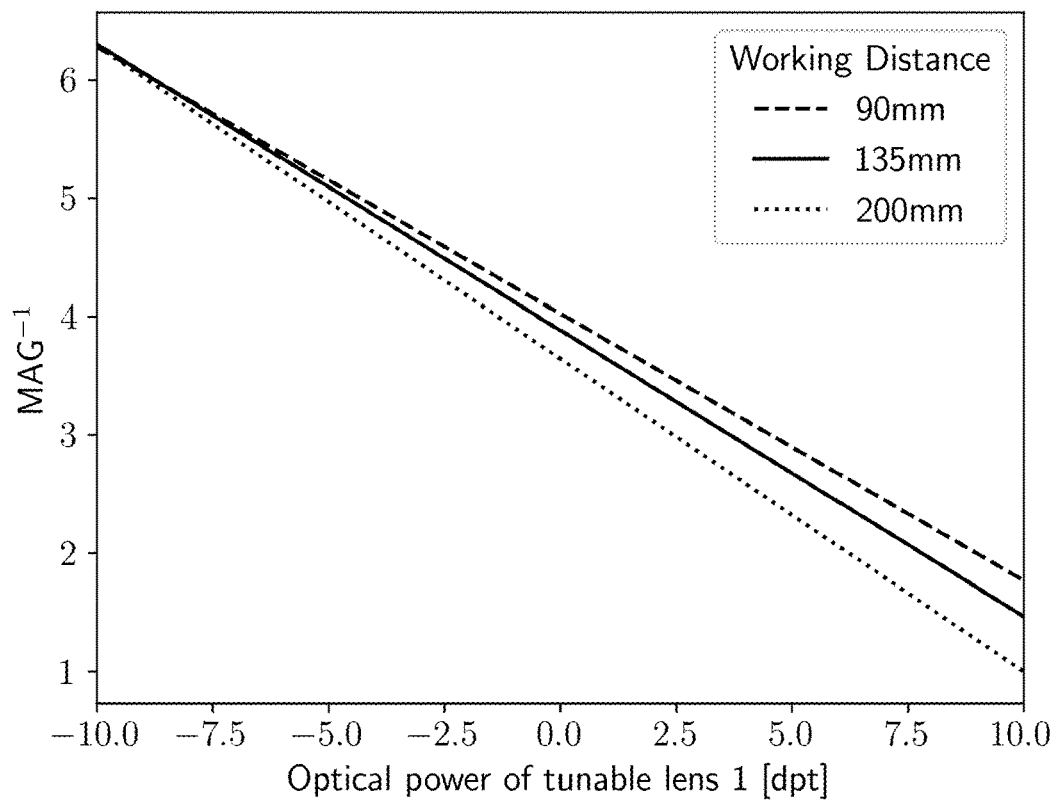
FIG. 6 shows the trend of the inverse magnification curve (MAG-1) of the zoom lens according to the present invention as a function of the optical power applied to the front adaptive lens, for various working distances.

For example, the graph of FIG. 6 represents a measurement of the inverse of the magnification (MAG-1) as a function of the optical power set for the front adaptive lens 10, for differing working distances.

The graph was produced using a real telecentric zoom lens. It may be noted how the optical power of the front adaptive lens 10 is inversely proportional to the magnification of the optical system, and how this law remains valid as the working distance varies.

Figure 7:
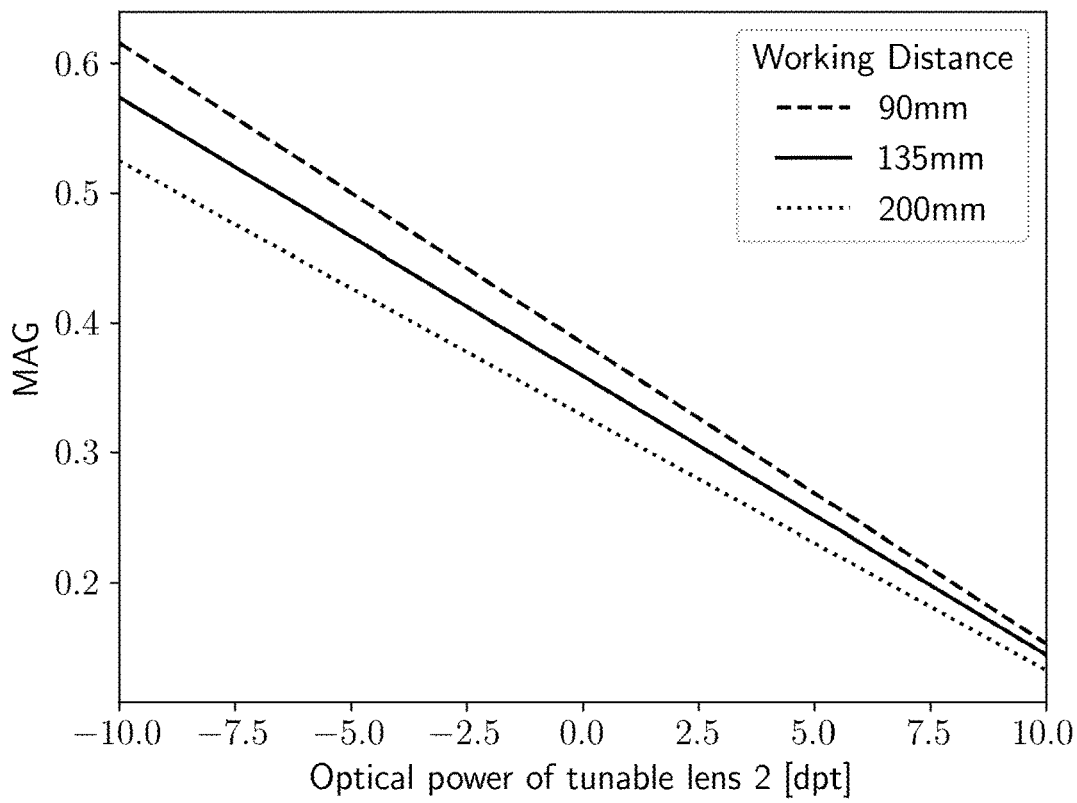
FIG. 7 shows the trend of the magnification curve (MAG) of the zoom lens according to the present invention as a function of the optical power applied to the rear adaptive lens, for various working distances.

The graph of FIG. 7 represents a measurement of the magnification (MAG) as a function of the optical power set for the rear adaptive lens 12, for differing working distances.

The graph was produced using a real telecentric zoom lens. It may be noted how the optical power of the rear adaptive lens 12 is directly proportional to the magnification of the optical system, and how this law remains valid as the working distance varies.

One object of the present disclosure, therefore, is an artificial vision device comprising a zoom lens as described above, a user interface, and a controller that is operatively connected to the user interface and the adaptive lenses. The controller is configured to control the optical power of the adaptive lenses as a function of a working distance and magnification which are selectable by a user through the user interface.

In particular, the controller is equipped with software implementing, for each adaptive lens and for each working distance, a calibration curve which links the optical power of the adaptive lens to the magnification of the zoom lens.

A person skilled in the art may make several changes, adjustments, adaptations, and replacements of elements with others that are functionally equivalent to the embodiments of the zoom lens and artificial vision device according to the present disclosure to meet incidental needs without departing from the scope of protection as described and claimed herein. Each of the features described as belonging to a possible embodiment may be obtained independently of the other described embodiments.

What is claimed is:

1. A zoom lens, comprising at least one front optical group with fixed optical power, adapted to receive rays from an observed object, at least one rear optical group with fixed optical power, adapted to convey said rays towards an image plane of a sensor, a lens opening positioned between the at least one front optical group and the at least one rear optical group, a front adaptive lens positioned between the at least one front optical group and the lens opening, and a rear adaptive lens positioned behind the lens opening, wherein the front and rear adaptive lenses are controllable to vary respective optical power so as to adjust focal length, magnification, and working distance of the zoom lens.

2. The zoom lens of claim 1, wherein the front and rear adaptive lenses are controllable so that the focal length, magnification, and working distance of the zoom lens are independently adjustable.

3. The zoom lens of claim 1, wherein the front and rear adaptive lenses are controllable so that the focal length, magnification, and working distance of the zoom lens are continuously adjustable.

4. The zoom lens of claim 1, wherein the at least one front and rear optical groups and the front and rear adaptive lenses are devoid of elements for adjusting a respective position along an optical axis of the zoom lens.

5. The zoom lens of claim 1, wherein the front adaptive lens and the rear adaptive lens each comprises an optical chamber containing a substance, and wherein the optical power of the front adaptive lens and of the rear adaptive lens is adjustable by applying an electrical or mechanical signal adapted to modify a shape of the optical chamber and/or an arrangement of the substance therein.

6. The zoom lens of claim 1, comprising a first front optical group and a second front optical group, wherein the first front optical group is adapted to collect the rays from an object space and convey the rays towards the second front optical group, and wherein the second front optical group is adapted to receive the rays from the first front optical group and direct said rays towards the front adaptive lens to optimize coupling of the rays from the first front optical group to an opening of front adaptive lens.

7. The zoom lens of claim 1, wherein the at least one front optical group is adapted to achieve a telecentric, entocentric, or hypercentric configuration.

8. The zoom lens of claim 1, comprising an intermediate optical group adapted to receive the rays from the front adaptive lens and direct the rays towards the lens opening to minimize spherical aberration.

9. The zoom lens of claim 1, comprising a first rear optical group and a second rear optical group, wherein the first rear optical group is adapted to receive the rays coming out of the lens opening and direct said rays towards the rear adaptive lens, so as to couple the rays from the lens opening to an opening of the rear adaptive lens, and wherein the second rear optical group is adapted to receive the rays coming out of the rear adaptive lens and direct said rays towards the image plane so as to minimize field curvature.

10. The zoom lens of claim 1, wherein the lens opening is manually or electrically changeable to adjust brightness and size of cones of rays forming an image.

11. The zoom lens of claim 1, wherein the zoom lens is optimized to achieve absolute magnification in a continuous manner, up to a 10× magnification, and wherein magnification ratio, that is ratio between the maximum absolute magnification achievable by an optical system and the minimum absolute magnification, in a continuous manner, takes a value up to a 20× magnification ratio.

12. The zoom lens of claim 1, comprising at least one coaxial lighting module positioned between any two optical elements of the zoom lens.

13. A vision device comprising a zoom lens that comprises at least one front optical group with fixed optical power, adapted to receive rays from an observed object, at least one rear optical group with fixed optical power, adapted to convey said rays towards an image plane of a sensor, a lens opening positioned between the at least one front optical group and the at least one rear optical group, a front adaptive lens positioned between the at least one front optical group and the lens opening, and a rear adaptive lens positioned behind the lens opening, wherein the front and rear adaptive lenses are controllable to vary respective optical power so as to adjust focal length, magnification, and working distance of the zoom lens, a user interface and a controller operatively connected to the user interface and the front and rear adaptive lenses, the controller being configured to control the optical power of the front and rear adaptive lenses as a function of a working distance and a magnification selectable by a user through the user interface.

14. The vision device of claim 13, wherein the controller is provided with software implementing, for each adaptive lens and each working distance, a calibration curve which links the optical power of the adaptive lens to the magnification of the zoom lens.

15. The vision device of claim 14, wherein the front and rear adaptive lenses are calibrated in advance taking into account temperature effects, and wherein the controller is provided with software implementing, for each adaptive lens and each working distance, a calibration curve which links the optical power of the adaptive lens to the magnification of the zoom lens.

* * * * *